United States Patent [19]

Lundeen

[11] Patent Number: 5,604,271

[45] Date of Patent: Feb. 18, 1997

[54] UNIVERSAL ADHESION PROMOTING COMPOSITION FOR PLASTIC REPAIR KIT INCLUDING SAME, AND METHOD OF USE

[75] Inventor: Richard H. Lundeen, Woodbury, Minn.

[73] Assignee: Minnesota Mining and Manufacturing Company, St. Paul, Minn.

[21] Appl. No.: 576,841

[22] Filed: Dec. 21, 1995

Related U.S. Application Data

[63] Continuation of Ser. No. 326,735, Oct. 20, 1994, abandoned, which is a continuation of Ser. No. 74,962, Jun. 10, 1993, abandoned.

[51] Int. Cl.$^6$ ............... C08K 5/05; C08K 5/07; C08K 5/10; C08L 63/02
[52] U.S. Cl. ............ 523/454; 523/455; 523/456; 525/525
[58] Field of Search .................. 523/454, 455, 523/456; 525/525

[56] References Cited

U.S. PATENT DOCUMENTS

| | | | |
|---|---|---|---|
| 3,099,632 | 7/1963 | De Crease | 523/454 |
| 3,258,495 | 6/1966 | LeFave et al. | 260/609 |
| 3,264,235 | 2/1966 | Hustiny | 523/454 |
| 3,794,609 | 2/1974 | Metil | 523/454 |
| 4,392,900 | 7/1983 | Helbing | 156/153 |
| 4,406,826 | 9/1983 | Morgan et al. | 252/512 |
| 4,591,522 | 5/1986 | Kang et al. | 428/419 |
| 4,623,702 | 11/1986 | Grieves et al. | 525/528 |
| 4,730,033 | 3/1988 | Horley et al. | 528/288 |
| 4,788,235 | 11/1988 | Johnson | 523/451 |
| 4,854,875 | 8/1989 | Kziki et al. | 433/213 |
| 4,868,229 | 9/1989 | Hart | 523/400 |
| 4,908,082 | 3/1990 | Ewener et al. | 156/94 |
| 4,943,237 | 7/1990 | Bryan | 433/213 |
| 4,948,443 | 8/1990 | Speer | 156/94 |
| 5,128,424 | 7/1992 | McGinnis et al. | 525/481 |
| 5,157,079 | 10/1992 | Duck et al. | 525/113 |

FOREIGN PATENT DOCUMENTS

| | | |
|---|---|---|
| 28859/77 | 3/1979 | Australia. |
| 0455400A2 | 11/1991 | European Pat. Off.. |
| 247024 | 2/1964 | Netherlands. |
| 2222217 | 2/1990 | United Kingdom. |
| WO94/00504 | 1/1994 | WIPO. |
| WO94/12552 | 6/1994 | WIPO. |

OTHER PUBLICATIONS

"Capure® EH–30" Product Bulletin, from Henkel Corp., 1988.

"Capcure® Series" Product Bulletin from Diamond Shamrock Chemicals Company, 1985.

Increase of Adhesive Bond Strength Through the Mechanochemical Creation Free Radicals: I*, M. Brenman and CH.H Lerchenthal, Polymer Engineering and Science, Nov. 1976, vol. 16, No.11.

Increase of Adhesive Bond Strength Through the Mechanochemical Creation of Free Radicals Part II. Shear and Peel Test Results, CH.H. Lerchenthal and M. Brenman, Polymer Engineering and Science, Nov. 1976, vol. 16, No. 11.

H. Lee and K. Neville, *Handbook of Epoxy Resins*, McGwiltill Book Co., New York, pp. 12–23, 16–21 to 22, 24–31 to 2 and 8–33 (1982 Deissue).

Japanese Patent Abstract, Week 6800, Derwent Publications Ltd., London, GB; AN 68–18396Q and JP, B, 43025676 (Pilot Pen Ltd.).

*Primary Examiner*—D. R. Wilson
*Attorney, Agent, or Firm*—Gary L. Griswold; Walter N. Kirn; Douglas B. Little

[57] ABSTRACT

Compositions and methods of use are presented suitable for use in priming a first plastic surface, such as an automobile bumper facie, for adhesion of a second plastic material thereto, such as an epoxy resin. The compositions comprise an epoxy resin and a priming solvent, where the epoxy resin is derived from the reaction product of a first organic material having a plurality of epoxy-functional groups and a second organic material, the second organic material being the combination of a material having a plurality of amine-functional groups and a material having a plurality of mercaptan-functional groups. The first and second organic materials are initially dissolved or dispersed in their respective organic solvents, the two solvents making up the priming solvent. The priming solvent is adapted to wet and penetrate but not be substantially retained by the first plastic surface where applied thereto. Kits useful in repairing plastic surfaces using the compositions of the invention are also presented.

9 Claims, 5 Drawing Sheets

UNIVERSAL ADHESION PROMOTING COMPOSITION FOR PLASTIC REPAIR KIT INCLUDING SAME, AND METHOD OF USE

This is a continuation of application Ser. No. 08/326,735 filed Oct. 20, 1994, now abandoned, which is a continuation of application Ser. No. 08/074,962 filed Jun. 10, 1993, now abandoned.

BACKGROUND OF THE INVENTION

1. Brief Description of the Invention

The present invention concerns compositions, and kits including same, suitable for use in priming a plastic surface for adhesion of a filler material to the plastic surface. More specifically, the compositions and kits of the invention include solvents which wet and penetrate but are not substantially retained by the plastic surface to allow a "featheredge" boundary between the filler and plastic.

2. Related Art

Recent advances in plastic injection molding technology has made it possible to form plastic auto body parts having high impact strength that are corrosion resistant. Two dominant forms of plastic materials used for bumper facie are reaction injection molded (RIM) urethane plastics and "thermoplastic polyolefins", more commonly referred to as "TPO". The use of such plastic auto body parts has resulted in an increasing demand for improved methods for repairing cracks, gouges, holes, and the like resulting from accidental damage. In order to produce an aesthetically pleasing repair, the boundary between the repaired region and the undamaged surface is preferably invisible when the auto body part is refinished, typically painted. Consequently, body fillers must adhere tenaciously to the plastic surface if the boundary is to be sanded perfectly smooth. At the sanded boundary region between filler and plastic, the filler material is extremely thin and tapered, producing what is commonly referred to as a "featheredge". The adhesion of the filler to the plastic substrate at this featheredge is critical in achieving an "invisible" repair acceptable to the customer.

Various types of primers have been developed which enhance featheredge adhesion between particular plastic and filler combinations, such as solvent-based solutions and water-based dispersions of chlorinated polyolefins which are effective in increasing the adhesion of epoxy fillers to TPO plastics, however chlorinated polyolefins are not known to be effective in increasing the adhesion of the epoxy fillers to other plastics. The inventor is not aware of a "universal" primer that effectively promotes adhesion between a wide range of plastic substrates and filler materials.

In a typical body shop, when a plastic auto body part is to be repaired, it must first be determined what the composition of the plastic body part is. This is because if the plastic autobody part is made of TPO, and if an epoxy body filler is to be used, the body part will typically require the use of a polyolefin adhesion promoter to achieve an effective repair. If the body part is RIM urethane, the epoxy filler material may be used without the adhesion promoter.

One typical test used to determine the composition of the plastic auto body part is to clean the area to be repaired with soap and water, followed by removal of any grease, wax and/or tar with a general purpose adhesive cleaner. The repair area is then typically ground with a high rpm sander, tapering into the damaged area. If the plastic body part grinds cleanly with no melted plastic next to the repair area, then the repair person knows that the automobile part is made of RIM urethane. If the grinding operation melted the plastic (i.e., there is actually melted plastic next to the area that was ground), the part requires the use of the polyolefin adhesion promoter, typically for both the repair material and any subsequent priming and/or painting operations. Therefore, it would be advantageous if a "universal" primer would be developed which would allow body fillers to be used with a variety of plastic automobile parts, including both RIM urethane and TPO, without having to first determine the composition of the plastic automobile part.

SUMMARY OF THE INVENTION

In accordance with the present invention, a first aspect of the invention is a composition suitable for use in priming a first plastic surface for adhesion of a second plastic material thereto is present. The composition comprises an epoxy resin and a solvent, the composition derived from the combination of:

a. a first composition comprising a first organic material having a plurality of epoxy-functional groups, the first organic material dispersed in a first organic solvent; and b. a second composition comprising a second organic material having at least one functional group reactive with epoxy-functional groups of the first organic material, the second organic material dispersed in a second organic solvent, wherein the first and second organic solvents comprise the solvent and the epoxy resin comprises a reaction product of the first and second organic materials, the solvent adapted to wet and penetrate, but not be substantially retained in the first plastic surface where applied thereto.

Preferred first plastic surfaces include thermoplastic polyolefins, polyurethanes, engineering elastomers, polyphenylene oxide/nylon rubber, and others described herein.

A preferred first organic material comprises the reaction product of bisphenol A and epichlorohydrin.

The first organic solvent preferably comprises one or more organic solvents, with the proviso that the combination has a solubility parameter ranging from about 7 to about 13. Those combinations found particularly useful in the present invention include combinations of:

a. a hydrocarbon having from 4 to 10 carbon atoms;

b. an alcohol having from 3 to 10 carbon atoms; and c. an ester having from 3 to 10 carbon atoms, with the proviso that the first organic material is soluble in the combination of a, b, and c.

The second organic material preferably comprises a major portion of a mercaptan-terminated polymer and a minor portion of an amine-functional material. This combination of mercaptan and amine epoxy curatives provides especially preferred featheredge adhesion.

The second organic solvent preferably comprises one or more organic solvents with the proviso that the combination has a solubility parameter ranging from about 7 to about 13. Those combinations found particularly useful include the combination of:

a'. a hydrocarbon having from 4 to 10 carbon atoms;

b'. an alcohol having from 3 to 10 carbon atoms; and c'. a ketone having from 3 to 10 carbon atoms, with the proviso that the second organic material is soluble in the combination of a', b' and c'

A second aspect of the invention is a kit suitable for use in priming a first plastic surface for adhesion of a second plastic material thereto, the kit comprising:

a. a first breakable ampule having therein a first composition comprising a first organic material having a plurality of epoxy-functional groups, the first organic material dispersed in a first organic solvent;

b. a second breakable ampule having therein a second composition comprising a second organic material having at least one functional group reactive with the epoxy-functional groups of the first organic material;

c. a body comprising a surface defining a concave region having a peripheral edge;

wherein the first ampule and second ampules are positioned within the concave region of the body, and a nonwoven article is attached on the peripheral edge of the body.

Preferred kits within this aspect of the invention are those wherein the first organic material comprises the reaction product of bisphenol A and epichlorohydrin, and wherein the first organic solvent is as defined above for the first aspect. Similarly, the preferred second organic material and second organic solvent are as described for the first aspect of the invention.

A third aspect of the invention is similar to the second aspect, except that the composition resulting from the mixture of first and second compositions has a weight percent solids varying from about 15 to about 20 weight percent. A particularly preferred kit is a kit containing a plurality of the previously defined inventive kits.

In some composition embodiments, it has been discovered that the weight percent solids may be essentially 100 percent.

A fourth aspect of the invention is a method of priming a first plastic surface to adhere to the first plastic surface a second plastic material, the method comprising the steps of:

a. applying to the first plastic surface the composition of the first aspect of the invention;

b. scrubbing into the first plastic surface the composition with a nonwoven article to form a primed first plastic surface while the combination of first and second organic solvents wets and penetrates but is not substantially retained in the plastic surface;

c. allowing the primed first plastic surface to stand for time sufficient to facilitate substantially complete evaporation of the first and second organic solvents; and d. allowing the first organic material and the second organic material to substantially react to form an epoxy resin.

A fifth aspect of the invention is a method of repairing a first plastic surface with a second plastic material to form a featheredge between the first plastic surface and the second plastic material, the method comprising the steps of:

a. applying to the first plastic surface the composition of the first aspect of the invention;

b. scrubbing into the first plastic surface the composition with a nonwoven article while the combination of first and second organic solvents wets and penetrates but is not substantially retained in the plastic surface;

c. allowing the primed first plastic surface to stand for a time sufficient to facilitate substantially complete evaporation of the first and second organic solvents;

d. allowing the first organic material and the second organic material to substantially react to form an epoxy resin;

e. applying to the surface resulting from step d. a curable plastic mixture;

f. allowing the curable plastic mixture to cure; and g. abrading the article of step f. with an abrasive article, thus forming the featheredge.

Preferred methods of repairing include those wherein the curable mixture comprises an epoxy resin, and wherein the curable mixture further includes a curing agent comprised of polymeric mercaptans and amine-functional compounds, as well as the first and second organic solvents of the first aspect of the invention. As used herein "curable plastic mixture" preferably includes a majority of an epoxy-functional resin and curative, with the understanding that the mixture may contain other curable organic materials, as well as inorganic compounds.

DESCRIPTION OF PREFERRED EMBODIMENTS

Organic materials useful in the invention as the first organic material having a plurality of epoxy-functional groups are commonly known. Epoxy-functional resins have at least 1 oxirane ring and are polymerized by the ring opening. As used herein, "epoxy-functional" denotes a resin before reacting with a curative, whereas the "epoxy resin" means the reaction product of an epoxy-functional resin with a curative. Such epoxy-functional include monomeric epoxy-functional resins and polymeric epoxy-functional resins. These resins can vary greatly in the nature of their backbones and substituent groups for the purposes of the invention. For example the backbone may be of any type normally associated with epoxy resins and substituent groups thereon can be any groups free of an active hydrogen atom that is reactive with an oxirane ring at room temperature (about 25° C.). Representative examples of acceptable substituent groups include halogens, ester groups, ether groups, sulfonate groups, siloxane groups, nitro groups and phosphate groups.

Examples of some preferred epoxy-functional resins include 2,2-bis(4-(2,3-epoxypropoxy)-phenyl)propane (a diglycidylether of bisphenol) and commercially available under the trade designations "Epon 828", "Epon 1004" and "Epon 1001F" from Shell Chemical Company, and "DER-331", "DER-332" and "DER-334" from Dow Chemical Company. Other suitable epoxy-functional resins include glycidyl ethers of phenol formaldehyde novolac resins (e.g., those known under the trade designations "DEN-431" and "DEN-428" available from Dow Chemical Company).

The second organic material having at least one functional group reactive with epoxy-functional groups of the first organic material functions to cure the epoxy resin by reacting therewith. Generally the functional group reactive with epoxy-functional groups may be any active hydrogen functionality reactive with epoxy functional groups, including mercaptans, amines (including primary, secondary, and tertiary amines) and polymeric versions thereof, including mercaptan-terminated polymers.

A particularly preferred second organic material comprises a major portion of a mercaptan-terminated polymer and a minor portion of an amine-functional material. One useful mercaptan-terminated polymer is that known under the trade designation "Capcure 3-800", available from Henkel Corporation. This tri-functional mercaptan-terminated liquid polymer has the following general structure:

wherein R is an aliphatic hydrocarbon and n is 1 or 2, color (Gardner-Hellige) 1, 1.15 sp. gr., 270 mercaptan hydrogen eq. wt., 10,000–15,000 cp @ 25° C. A suitable amine-terminated curing agent is that available under the trade designation "Capcure EH-30", also available from Henkel Corporation. In the above table, the values for curative equivalents and epoxy equivalents reflect relative, not absolute values. The weight ratio of mercaptan-terminated polymer to amine-functional curing agent may range from about 2:1 to about 20:1, more preferably ranging from about 8:1 to about 12:1, particularly about 8:1. Other suitable epoxy curatives are those known under the trade designations "Epo-Tuf 37-612" and "Versamide 140", both of which are polyamides. Still other suitable amine curatives include those known under the trade designations "Jeffamine", such as "Jeffamine D-230" and diethylene triamine Another useful epoxy curative has been found to be antimony pentafluoride dissolved in diethylene glycol, used at about 0.05 part to about 7 parts epoxy-functional resin.

The first organic solvent functions to dissolve or disperse the epoxy-functional first organic material. As previously noted, preferably the first organic solvent is a combination of a hydrocarbon, an organic alcohol, and an organic ester. Suitable hydrocarbons include aromatic, aliphatic and cycloaliphatic hydrocarbons having from 4 to 10 carbon atoms, such as toluene, hexane, and the like. Suitable alcohols having 3 to 10 carbons include isopropanol, n-butyl alcohol, isobutyl alcohol, t-butyl alcohol, and the like. Suitable esters having from 3 to 10 carbon atoms include ethyl formate, ethyl acetate, propylisobutyrate, isopropyl-isobutyrate, and the like.

Figure 1:
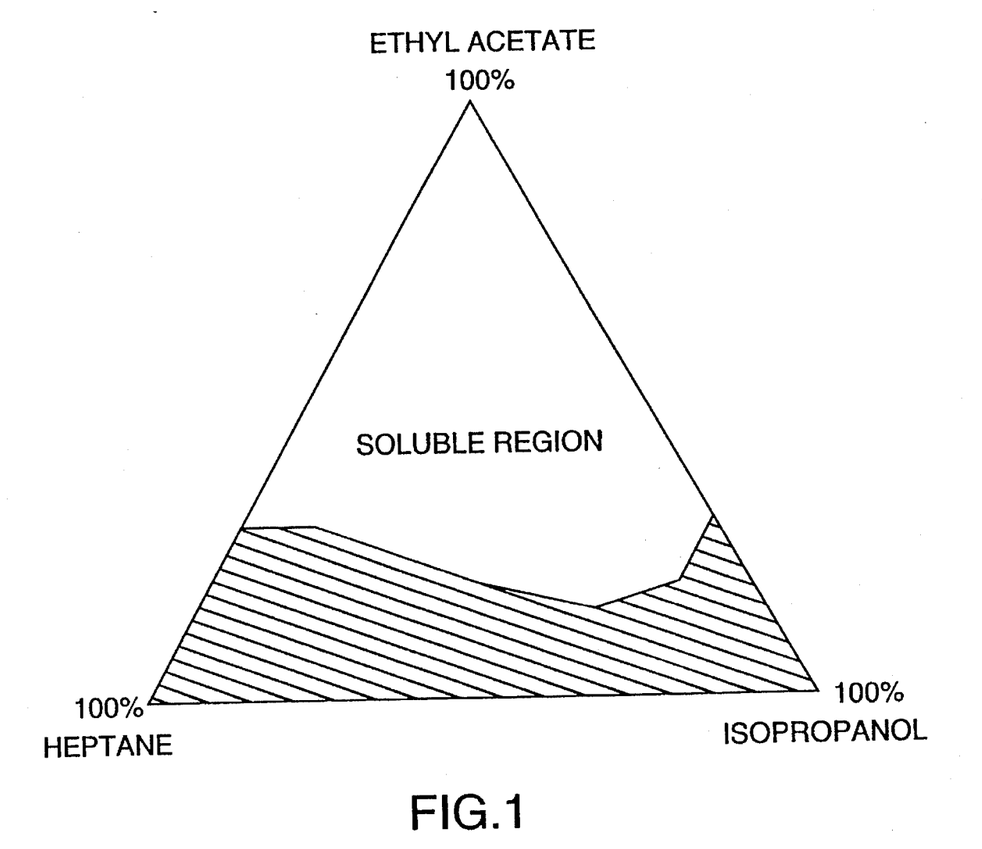
FIG. 1 is a solubility diagram of the ethyl acetate/heptane/isopropanol solvent system having a first organic material (epoxy-functional material) dispersed therein.

It should be understood that the mixture of hydrocarbon, alcohol, and ester in the first organic solvent must be such as to render the epoxy-functional organic material completely soluble therein. For example, for the ethyl acetate, isopropanol, heptane solvent system illustrated in FIG. 1, the epoxy resin known under the trade designation "Epon 828", at about 15 percent solids is completely soluble only in compositions in the upper half of the solubility diagram.

Organic solvents found useful in the invention (for both first and second organic solvents) preferably have a solubility parameter of at least about 7 (cal-cm$^{-3}$)½ and no more than about 13 (cal-cm$^{-3}$)½ (commonly known as Hildebrand units). Compositions including solvents within this range of solubility parameters tend to allow complete solubility of epoxy-functional resins and curatives found useful in the invention. Solubility parameters of organic solvents useful in the invention include heptane (7.4), isopropyl alcohol (12), ethanol (12.7), methyl ethyl ketone (9.3), and ethyl acetate (9.1). A discussion of solubility parameters of organic compounds and how to derive them from physical data is given in *The Handbook of Chemistry and Physics*, 58th Ed., pp. C-726–C-732, published 1977 by Chemical Rubber Company Press, Inc., West Palm Beach, Fla., and is incorporated herein by reference.

The first organic material having epoxy functionality is generally present in the first organic solvent in a weight ratio of organic material to organic solvent ranging from about 0.1:1 to about 1:1, more preferably ranging from about 0.1:1 to about 0.5:1. A particularly preferred first composition is given in Example 1 below under the heading "Preparation of Epoxy Dispersion".

The second organic solvent functions to dissolve or disperse the second organic material having at least one functional group reactive with epoxy-functional groups. As previously noted, the second organic solvent preferably comprises a mixture of a ketone, an alcohol and a hydrocarbon. The hydrocarbon and alcohol may be selected from those previously described with reference to the first organic solvent. Ketones suitable for use in the present invention are those including 2-butanone (commonly known as methyl ethyl ketone), 2-pentanone, 3-pentanone, 2-hexanone, 3-hexanone, 2-heptanone, and the like.

Figure 2:
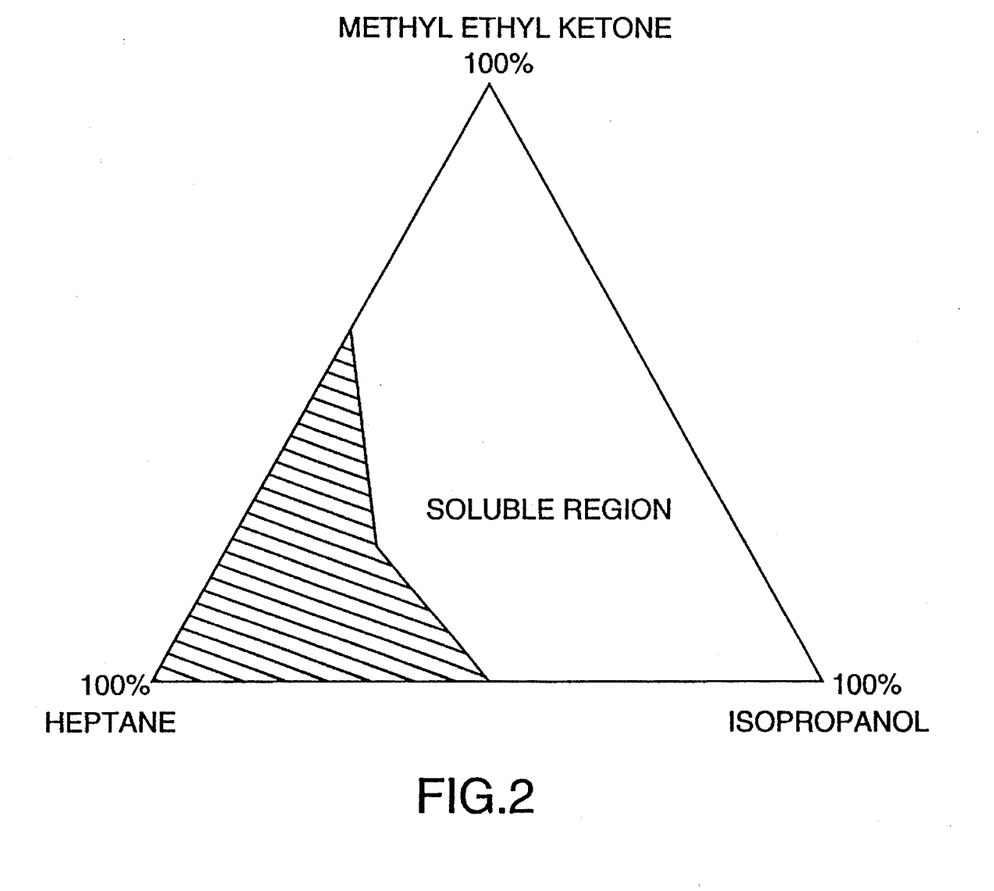
FIG. 2 is a solubility diagram of the methyl ethyl ketone/heptane/isopropanol solvent system having a second organic material (mercaptan/amine) dispersed therein.

As with the first organic material and the first organic solvent, a solubility diagram may be developed using particular ketones, hydrocarbons, and alcohols as solvents having curing agents therein. FIG. 2 shows a solubility diagram for the methyl ethyl ketone, heptane, isopropanol system, showing the completely soluble region on the right hand side of the solubility diagram for a mixture of the mercaptan/amine curing agents known under the trade designations "Capcure 3-800" and "Capcure EH-30", at a total solids percent of about 20 weight percent.

As with the first organic solvent, the second organic solvent preferably has a solubility parameter of at least about 7 and no more than about 13 Hildebrand units.

It is of course the primary intention of the present invention to repair a variety of plastic surfaces, especially TPO, which have been damaged, for example, in an automobile accident. It is thus quite important that the first and second compositions, as described above, are adapted to be mixed to form a composition comprising a combination of the first and second organic solvents and an epoxy resin, wherein the combination of first and second organic solvents is adapted to wet and penetrate, but is not substantially retained in the plastic surface where applied thereto. It has been found by the inventor herein that the combination of first and second organic solvents as described above have the property that they wet and penetrate, but are not substantially retained in TPO and RIM urethane plastic surfaces. Therefore, the user of the compositions and kits of the invention does not necessarily have to determine the composition of the plastic surface, or the solubility parameter of the plastic material. This, of course, is one of the advantages of the present invention, that of reducing the necessity (or completely eliminating) the step of determining the composition of the plastic part to be repaired. For TPO and RIM urethane plastic surfaces, it has been found that when using the first and second compositions as above described, the composition resulting from the mixture thereof preferably has a weight percent solids ranging from about 10 to about 30 weight percent, more preferably ranging from about 15 to about 20 weight percent, in order that the wetting, penetration, and substantially no retention properties are achieve.

Various plastic substrates commonly used in automobile bumpers and other automotive parts may be repaired using the teaching the present invention. Examples include the thermoplastic polyolefins known under the trade designations "ETA-3163" and "ETA-3095" (Himont U.S.A. Inc., Lansing, Mich.); "Lomod XA-1320" (an engineering elastomer available from GE Plastics, Pittsfield, Mass.); "GTX-910" (a polyphenylene oxide/nylon rubber available from GE Plastics, Pittsfield, Mass.); "Xenoy" (a polycarbonate/polybutylene terephthalate blend available from GE Plastics, Pittsfield, Mass.); the thermoplastic elastomer blends known under the trade designations "Bexloy V-978" and "Bexloy V-572" (available from DuPont, Troy, Mich.); "Pulse" (a polycarbonate/acrylonitrile-butadiene-styrene blend available from Dow Chemical U.S.A., Southfield, Mich.); "Bayflex 110" (a polyurethene available from Miles Inc., Polymer Division, Pittsburgh, Penn.); and "Bayflex 150" (a polyurea also available from Miles Inc., Polymer Division, Pittsburgh, Penn.).

When one desires to prime a plastic surface to be repaired in accordance with the present invention, one first applies to the plastic surface to be repaired a composition resulting from the mixture of the above-noted first and second compositions. The first and second compositions are preferably mixed in contact with the plastic to be repaired so that the combination of first and second organic solvents may wet and penetrate into the plastic surface to be repaired. Alternatively, the first and second compositions may be mixed at an alternative location and transferred to the part to be repaired; however, care must be taken that sufficient organic solvent exists to wet and penetrate the plastic surface to be repaired.

After application of the first and second compositions to the plastic part to be repaired, the resulting composition is then scrubbed into the plastic surface with a nonwoven pad such as that known under the designation "SCOTCH-BRITE" No. 220, which is approximately 5×5 centimeters in dimension. The scrubbing is preferably accomplished by scrubbing with moderate hand pressure in a confined circular pattern across the entire surface to be primed. The total scrubbing time may vary widely but is generally no more than about 30 seconds. After scrubbing, the primed surfaces typically allowed to stand for about 10 minutes to facilitate complete solvent evaporation and allow the cure reaction to advance.

If the surface is then to be immediately repaired, a layer of filler material, such as known under the trade designation "3M Brand Flexible Parts Repair Material", is applied to the primed surface using a plastic squeegee or other means to an approximate thickness of about 400 to about 1,000 micrometers. The above-noted flexible parts repair material is preferably an epoxy repair material, typically prepared by mixing equal parts (about 10 grams total) of an epoxy resin and a curing agent. These two materials are typically marketed in separate tubes, such as the epoxy resin known under the trade designation "Flexible Parts Repair Material No. 5900A" (amine curing agent) and "Flexible Parts Repair Material No. 5900B" (epoxy-functional resin), both available from 3M. Preferably, the density of the epoxy-functional resin and the amine curing agent are about equal, so that when equal volumes of the two compositions are applied, substantially equal weights are applied.

After application of the filler material, the filled surface is typically allowed to stand so that the filler material may cure, this generally taking from about 20 to about 40 minutes. The filled surface is then smoothed using a dual action sander or other sanding means. Preferred abrasives for this use are those known under the trade designations "STIKIT GOLD GRADE 180" available from Minnesota Mining and Manufacturing Company, St. Paul, Minn., ("3M").

Those skilled in the art will recognize that when a TPO or RIM urethane part is to be repaired, it is first generally desirable to wash the area with soap and water, rinsing thoroughly with water, followed by wiping dry with an article such as paper toweling. Those skilled in the art will frequently use a hydrocarbon base cleaner (such as 3M General Purpose Adhesive Cleaner Part No. 08984, available from 3M) by applying the cleaner to the area to be prepared, the amount used being sufficient to allow a wet wipe across the entire surface without saturating the surface with cleaner. Hydrocarbon cleaners are typically removed by wiping with a dry cheesecloth, which simultaneously removes hydrocarbon soluble surface contaminants surrounding the damaged area. Typically evolved time of 10 minutes is allowed to allow residual traces of the hydrocarbon cleaner to evaporate.

Those skilled in the art will also recognize that the area surrounding the damage on the surface of the plastic TPO or RIM urethane part to be repaired is typically abraded using a coated or other abrasive material. Typically a dual action sander, such as that made by National Detroit, using an air pressure of about 415 kilopascals with a coated abrasive known under the trade designation of "STIKIT GOLD GRADE 180" or coarser abrasive is used to abrade the cleaned plastic part until a uniformity of abrasive cut is achieved. Those skilled in the art will further recognize that dust and dirt are preferably completely removed by an air hose or other means to achieve a high quality featheredge adhesion of repair material to original damaged plastic part. The above conventional cleaning steps are generally carried out no matter what the priming procedure is and are not a part of the present invention.

Figure 3:
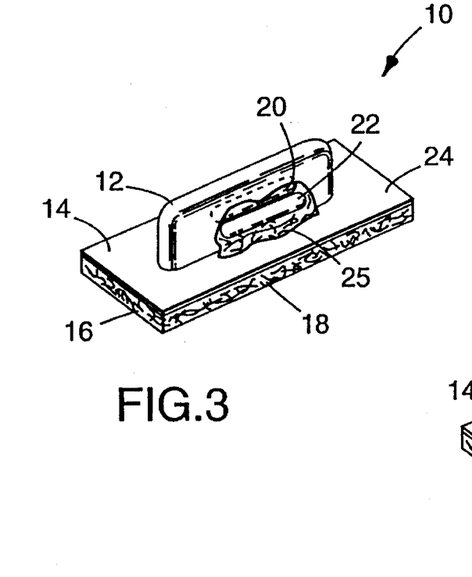
FIG. 3 is a perspective view, with parts broken away, of a kit in accordance with the invention.

Referring again to the figures, FIG. 3 illustrates in perspective (with parts broken away) of a kit in accordance with the invention. Kit 10 comprises a body 12, typically plastic (more typically thermoformed plastic) having a peripheral edge 14 to which a nonwoven scrubbing article 16 is attached. Nonwoven 16 preferably comprises a plurality of organic thermoplastic fibers 18. One useful nonwoven is that known under the trade designation SCOTCH-BRITE brand Cleaning and Polishing Rolls Type T, available from 3M, comprised of polyester fibers bound at points of contact with a urethane resin, and having no mineral abrasive therein. Other preferred nonwovens are those known under the trade designation "SCOTCH-BRITE", also available from 3M, particularly Pad No. 220. The "Type T" nonwovens may be preferred in some embodiments of the kits of the invention since those nonwovens tend to "hold" the mixture of first and second compositions better than the other nonwovens known under the trade designation "SCOTCH-BRITE". Actually, any material that does not dissolve under the conditions of exposure to the solvents and resins used herein may be used, assuming it has abrasive character, such as an abrasive filled polyurethane foam. Body 12 may also be made of any material that does not dissolve under the conditions of exposure to the solvents and resins used herein. Body 12 is typically made from polyvinyl chloride and the like plastic material.

As can be seen in FIG. 3, in the portion which is broken away from body 12, there is exposed two ampules 20 and 22, commonly formed of glass or other easily breakable material. Ampule 20 may hold the first composition within the invention, while ampule 22 may hold the second composition. Obviously, the contents of the two ampules 20 and 22 may be reversed. Body 12 includes a deck portion 24 which has a region directly under the ampules 20 and 22 which is open to nonwoven 16, so that when ampules 20 and 22 are broken, such as by grasping body 12 between the thumb and forefinger of the user, the ampules break and the compositions flow out through nonwoven 16 onto the plastic surface to be repaired.

Figure 4:
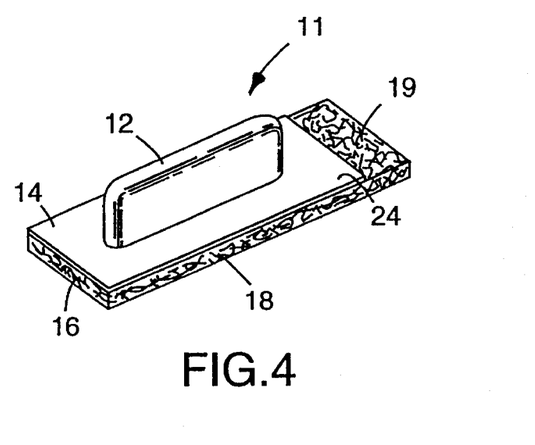
FIG. 4 is a perspective view of the kit of FIG. 3a without parts broken away, showing an additional feature of the invention.

FIG. 4 illustrates the embodiment of FIG. 4 with an additional feature 19, which is an extension of nonwoven 16. This feature allows the user to fold nonwoven 16 over deck 24, allowing the user to scrub creases or other hard to reach areas.

Figure 5:
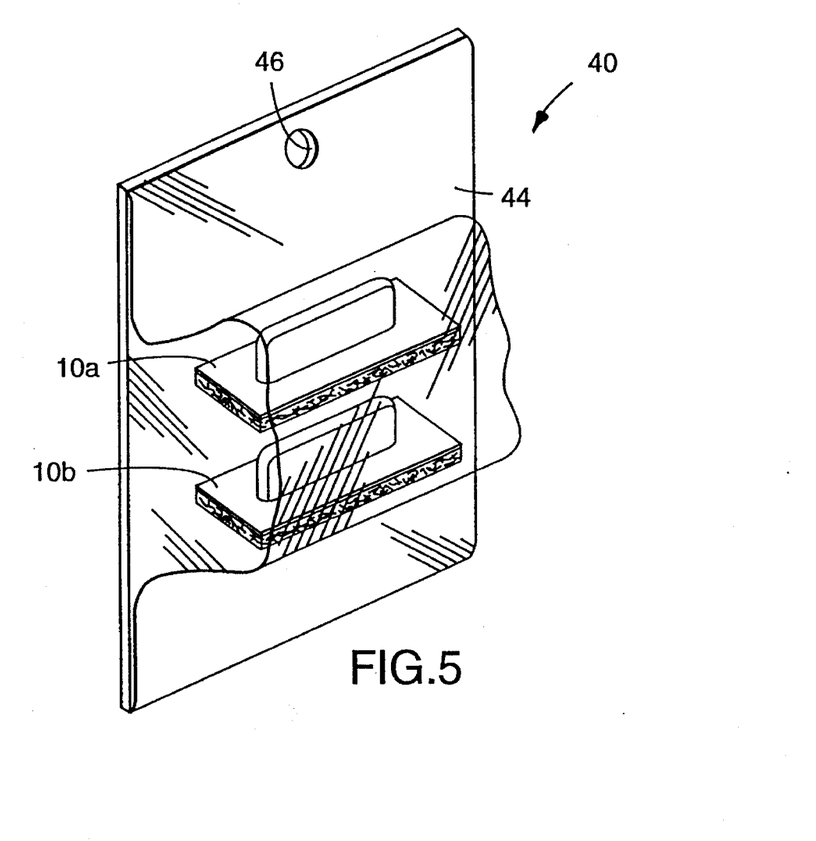
FIG. 5 is a perspective view of another kit of the invention.

Referring now to FIG. 5 there is illustrated another preferred kit within the invention wherein a plurality of kits 10a and 10b (which are identical in nature to the kit 10 of FIG. 3) are included in a larger kit 40. Kit 40 includes a backing 42, such as a cardboard, which has laminated thereover a plastic bubble 44 which holds kits 10a and 10b therein. Of course, kit 40 may include more than two kits 10. Kit 40 may also include a through-hole 46 for hanging in a rack, such as in a store, in an autobody shop, and the like.

Figure 6:
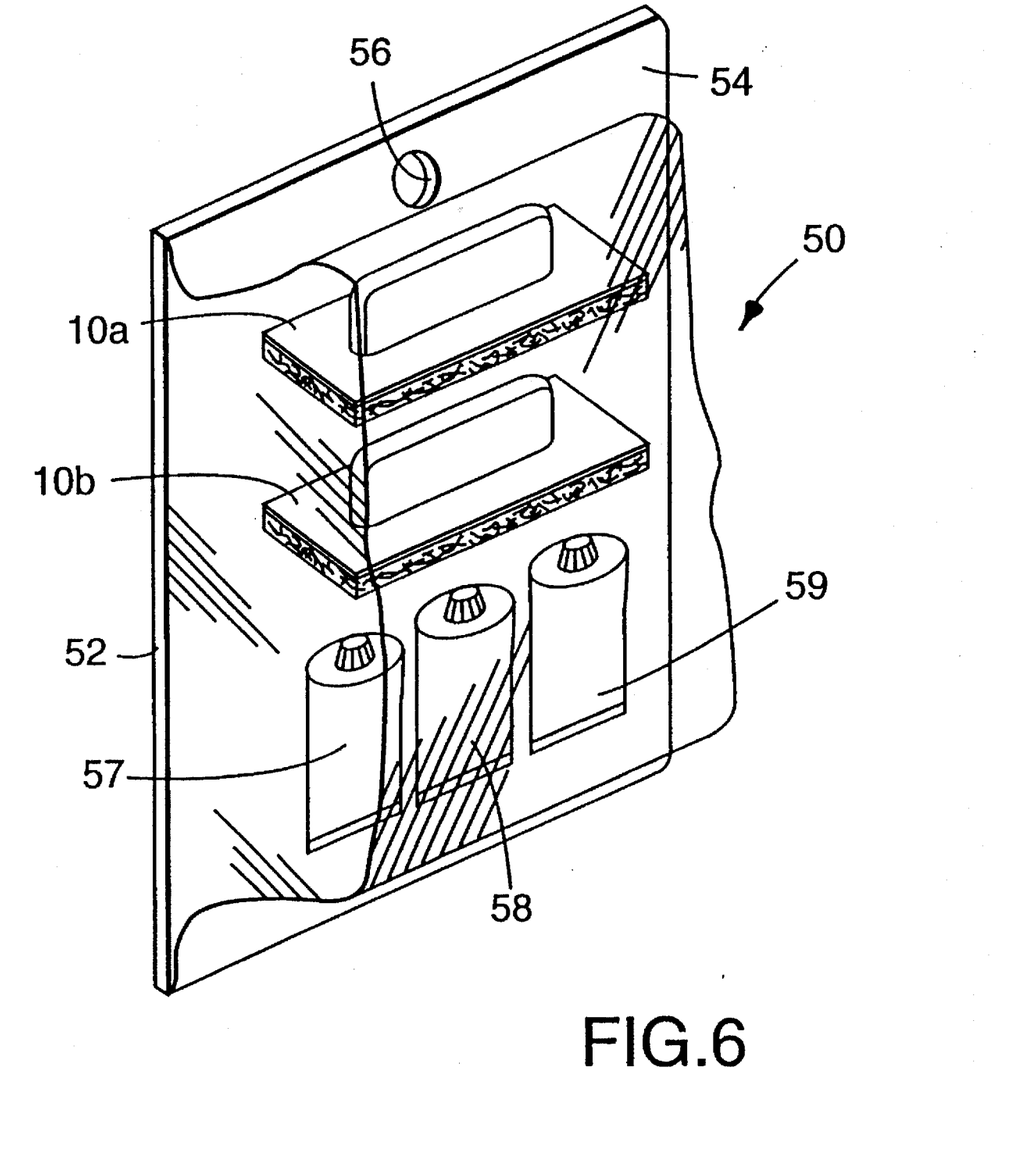
FIG. 6 is a perspective view of yet another kit within the invention.

Referring now to FIG. 6, there is illustrated another preferred kit 50 of the invention similar to the kit 40 of FIG. 5. Kit 50 of FIG. 6 includes two kits 10a and 10b which are as described in FIGS. 3 and 5. Cardboard or other backing material 52 supports a plastic bubble 54 which may be made of polypropylene, polyethylene and the like. Included in kit 50 are three tubes 57, 58 and 59, which may hold, for example, epoxy-functional resin, epoxy curative, and hydrocarbon cleaning fluid, respectively. Kit 50 illustrated in FIG. 6 is essentially complete except for the abrasive articles which might be used to initially grind the plastic part to be repaired, and of course do not include soap and water. A through-hole 56 may be used in like manner as the through-hole 46 of FIG. 5, as described previously.

The features of the various aspects of the invention will be better understood in reference to the following Test Methods and Examples, wherein all parts and percentages are by weight unless otherwise specified.

TEST METHODS

TEST METHOD FOR FEATHEREDGE ADHESION

A series of 7.62×22.86 cm plaques of plastic materials to be tested were prepared for the featheredge test as follows:

1) The plaques were washed with soap (conventional hand soap) and water, rinsed thoroughly with water, followed by wiping dry with paper toweling. The plaques were further cleaned using 3M General Purpose Adhesive Cleaner Part No. 08984 by applying cleaner to the plaques in an amount to allow a wet wipe across the entire surface without saturating the surface with the cleaner. The plaques were then wiped with cheesecloth to remove the surface contaminants. A dwell time of 10 minutes was allowed for the General Purpose Adhesive Cleaner to evaporate completely from each plaque.

2) The plaques were abraded using a Dual Action Sander, made by National Detroit, that was supplied with 60 psi (415 kilopascals) air pressure. The coated abrasive utilized was known under the trade designation "3M STIKIT GOLD GRADE 180", and the plaques abraded until a uniformity of abrasive cut was achieved. Dust and dirt were blown off the plaques with an air hose.

3) The adhesion promoter to be tested (0.5 grams) was then applied to a 10×15 centimeter area of a cleaned plaque. Immediately following the application of the adhesion promoting composition, the composition was hand scrubbed into the plaque for 15–30 seconds using confined circular motions and a nonwoven pad known under the trade designation "SCOTCH-BRITE" Scour Pad, Cat. No. 220. The composition was then allowed to get idle for about 10 minutes to evaporate the solvents and cure the epoxy resin.

4) A layer of filler material (known under the trade designation "3M Flexible Parts Repair Material" Part No. 5900) was then applied to the primed plaque using a plastic squeegee to an approximate thickness of 15–40 mils (0.038–0.102 cm). The filler material was prepared by mixing equal volumes of an epoxy resin known under the trade designation "Flexible Parts Repair Material" Part No. 5900 A, and an epoxy curative known under the trade designation "Flexible Parts Repair Material" Part No. 5900 B, until a uniform gray color was apparent.

The filler material was afforded a 30 minute dwell time to establish cure, after which the material was abraded from the surface utilizing the sander and coated abrasive, as described above.

The filler material was abraded in each case until a clear definition between the plaque plastic and filler was visually noted.

Figure 7:
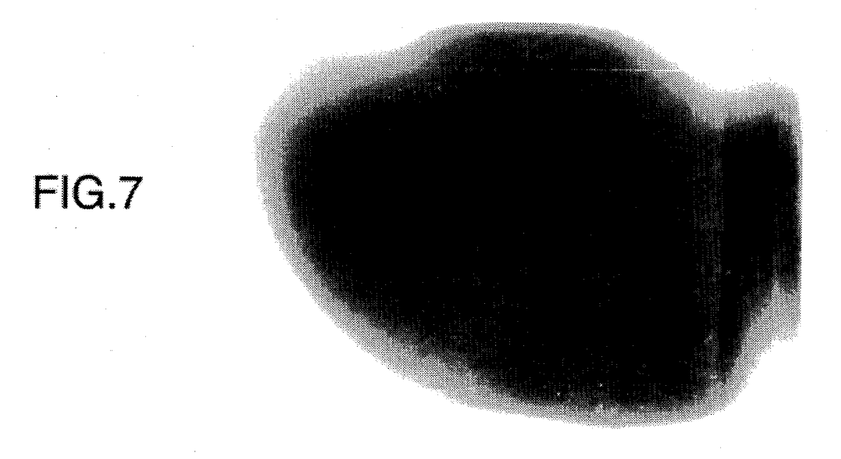
FIGS. 7–9 are photographs of "pass", "marginal" and "fail" tests for featheredge adhesion, respectfully.

The test results were interpreted by comparing against standard plaques as follows:

Pass: A smooth transition between plaque plastic and filler wherein a very thin layer, or "halo" of filler was noted visually; also no chipping or peeling along the perimeter (featheredge) of the filler/plaque interface (see FIG. 7).

Figure 8:
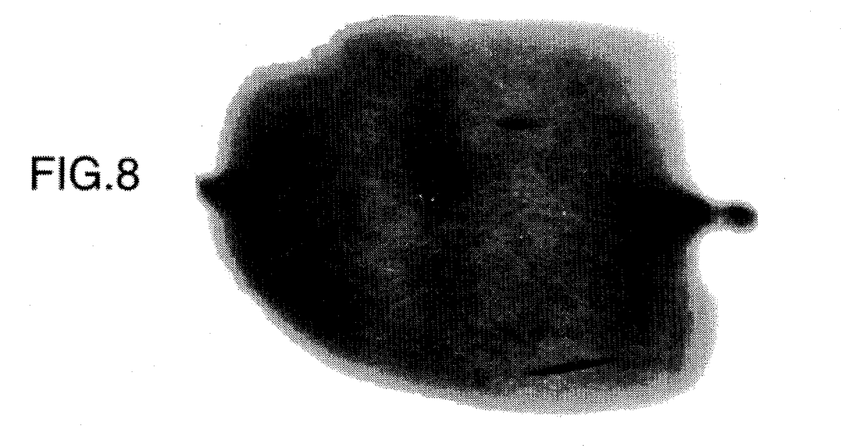

Marginal: Same as FIG. 7, only very slight chipping of the filler material at the featheredge perimeter (see FIG. 8).

Figure 9:
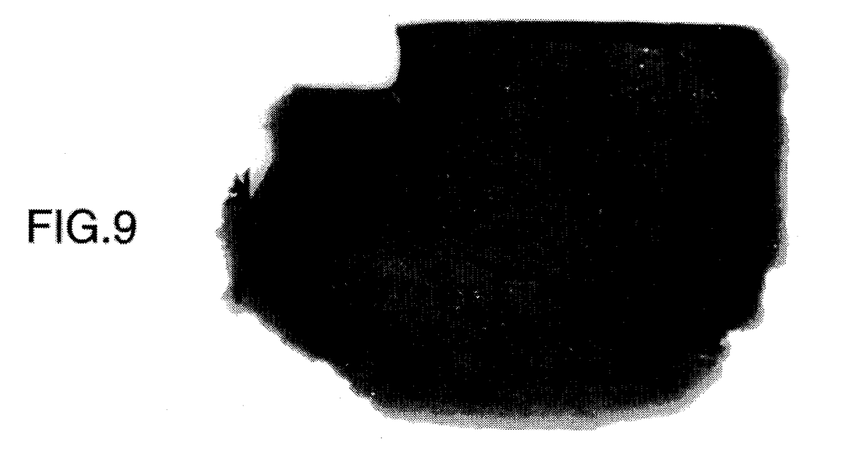

Fail: Virtually no adhesion. The filler rolls, peels, or chips off the plaque during abrasion (see FIG. 9).

TEST METHOD FOR SOLVENT RETENTION BY PLASTIC MATERIALS

A plaque of the plastic material to be tested was prepared for testing the amount of solvent that the plastic retained. A higher amount of solvent retained was considered not preferred. The test procedure was as follows:

1) Each plastic plaque to be tested was abraded using a Dual Action Sander, made by National Detroit, that had attached thereto a coated abrasive known under the trade designation "3M STIKIT GOLD GRADE 180", and the plaque was abraded using 415 kilopascals air pressure until a uniformity of abrasive cut was achieved. Dust and dirt were blown off the plaque using an air hose.

2) A test specimen (3.20×4.45 centimeters) was cut from the plaque and weighed accurately to 4 decimal places using a Mettler Analytical Balance "AE-200". The solvent to be tested was drawn into a pipet to achieve a weight of 0.30 grams. The solvent was pipeted onto the abraded side of the plaque which was in a flat horizontal position. The solvent was allowed a dwell time of 15 seconds in the horizontal position, after which the plaque was subsequently lifted to a vertical position for an additional 45 seconds, to enable the excess solvent to be removed from the plaque, for a total solvent dwell time of 60 seconds. The aforenoted procedure was considered one cycle. The test consisted of 3 cycles of placing 0.30 grams of solvent on the plaque and allowing 60 seconds of evaporation as described above.

3) Upon completion of 3 cycles, the test specimen was immediately weighed on the analytical balance as well as at dwell times of 10 minutes, 30 minutes, 1 hour and 24 hours. The amount of solvent retained by the specimen was determined by the difference between the specimen weights before and after the 3 cycles and recorded grams.

TEST METHOD FOR OVERLAP SHEAR ADHESION OF FILLER TO PLASTIC

The overlap shear adhesion tests were run in accordance with American Society for Testing and Materials (ASTM) D638-90 entitled *Standard Test Method for Tensile Properties of Plastics*. The test specimens were pulled at a crosshead speed of 5 centimeters per minute.

EXAMPLE 1

Preparation of Epoxy Curative (Second Inventive Composition)

Fifty grams of second composition of the invention was prepared by dissolving 9.15 grams of a mercaptan-terminated polymer (tradename "Capcure 3-800", available from Henkel Corporation), and 0.915 grams of amine (tradename "Capcure EH-30", also available from Henkel Corporation) in a solvent mixture consisting of 5.22 grams of methyl ethyl ketone and 14.78 grams of isopropyl alcohol. This solution was further diluted with 19.97 grams of heptane. The resulting second composition had a density of 0.8179 grams per cubic centimeter and a mercaptan/amine equivalent of 0.058 per 100 milliliters of composition. Preparation of Epoxy Dispersion (First Inventive Composition)

Fifty grams of first composition of the invention was prepared by dissolving 7.35 grams of the epoxy resin known under the trade designation "Epon 828" (available from Shell Chemical Co., Inc.) in a solvent mixture consisting of 12.8 grams of ethyl acetate and 4.26 grams of isopropyl alcohol. This composition was further diluted with 25.6 grams of heptane. The resulting first composition had a density of 0.7888 grams per cubic centimeter and an epoxide equivalent of 0.0611 per 100 milliliters of composition. Repairing a damaged Thermoplastic Polyolefin (TPO) test plaque.

A damaged TPO test plaque (HIMONT 3163, available from Himont USA Inc., which is a mixture of polypropylene and ethylene-propylene-diamine) was cleaned, primed, repaired, and tested as follows:

Step 1. The plaque was washed with soap (conventional hand soap) and water, rinsed thoroughly with water, followed by wiping dry with paper toweling. The plaque was further cleaned using mixed hydrocarbon based cleaner (3M General Purpose Adhesive Cleaner Part No. 08984, available from 3M Company, St. Paul, Minn. 55144) by applying cleaner to the plaque. The amount used was sufficient to allow a wet wipe across the entire surface without saturating the surface with the cleaner. A dwell time of 10 minutes was provided to allow residual traces of the cleaner to evaporate.

Step 2. The area surrounding the damage on the surface of the plaque was abraded using a Dual Action Sander, made by National Detroit, using air pressure of about 415 kilopascals. The coated abrasive used was 3M brand "STIKIT GOLD GRADE 180", and the plaque was abraded until a uniformity of abrasive cut was achieved. Dust and dirt were blown off with an air hose.

Step 3. The surface of the plaque in the vicinity of the repair (an area of about 10×15 centimeters) was primed by simultaneously flooding the region with 0.5 grams of first composition and 0.5 grams of second composition. The resulting mixture had solids content of 17.4%. In order to obtain the benefit of the inventive priming process, the two-part priming composition was scrubbed into the plastic surface with a nonwoven pad known under the trade designation 3M "SCOTCH BRITE" Pad, Cat. No. 220, approximately (5×5 centimeters). The priming was accomplished by scrubbing with moderate hand pressure in a confined circular pattern across the entire surface to be primed. Total scrubbing time was 15 seconds. The primed surface was allowed to stand 10 minutes to facilitate complete solvent evaporation prior to proceeding.

Step 4. A layer of epoxy filler was applied to the primed surface using a plastic squeegee to an approximate thickness of 400 to 1000 micrometers.

The epoxy filler was prepared by mixing equal volumes (about 10 grams total) of 3M brand Flexible Parts Repair Material No. 5900 A and Flexible Parts Repair Material No. 5900 B, until a uniform gray color was obtained. The filled surface was allowed to cure minutes prior to smoothing with the Dual Action Sander and 3M brand "STIKIT GOLD GRADE 180", described above. The cured filler was sanded until a flat, smooth transition between plaque and filler was observed. ps Test Results The featheredge adhesion was rated: PASS The overlap shear adhesion was: 230 pounds per square inch (1.59 MPa).

EXAMPLES 2–5

The following examples were controls. They showed the effect of omitting various components from the inventive first and second compositions as formulated in Example 1. Damaged TPO test plaques were repaired and tested using the procedure of Example 1.

EXAMPLE 2

When Capcure 3-800 (mercaptan) was omitted from the second inventive composition, the featheredge adhesion was rated MARGINAL, and the overlap shear adhesion was 247 PSI (1,708 MPa).

EXAMPLE 3

When Capcure EH-30 amine was omitted from the second inventive composition, the featheredge adhesion was rated FAIL, and the overlap shear adhesion was 238 PSI (1.645 MPa).

EXAMPLE 4

When only the first inventive composition was used, the featheredge adhesion was rated FAIL, and the overlap shear adhesion was 223 PSI (1,542 MPa).

EXAMPLE 5

When Capcure EH-30(amine) was omitted from the second inventive composition and none of the first inventive composition was used, the featheredge adhesion was rated FAIL, and the overlap shear adhesion was 128 PSI (0.885 MPa).

Examples 2–5 clearly showed that all components were necessary to achieve featheredge and high overlap shear adhesion. Omitting curing agent and/or epoxy resin components may cause featheredge failure; however, overlap adhesion may improve (over the unprimed control). The only exception was that of Example 5.

EXAMPLES 6–16

Examples 6–16 illustrate the effect of varying the percent solids of the priming composition (i.e., combination of first and second inventive compositions from Example 1) resulting from combining equal weights of each composition.

| Ex. No. | % Solids | Featheredge | Overlap Shear Adhesion (MPa) |
|---|---|---|---|
| 6[1] | 0 | Fail | 0.712 |
| 7[2] | 0 | Fail | 1.259 |
| 8 | 2.5 | Pass | 1.438 |
| 9 | 5.0 | Pass | 1.569 |
| 10 | 10 | Pass | 1.569 |
| 11 | 16 | Pass | 1.577 |
| 12 | 25 | Pass | 1.798 |
| 13 | 35 | Pass | 1.798 |
| 14 | 50 | Pass | 1.694 |
| 15 | 70 | Pass | 1.348 |
| 16 | 100 | Pass | 1.030 |

[1] no scrubbing and no priming, filler only
[2] 50:37:13 heptane/isopropanol/MEK primer, with scrub, but without epoxy-functional material and curative The results of Examples 6–16 showed there was an optimum value of percent solids in the range of from 5% to 50% solids that produced maximum values of the overlap shear adhesion in the range of 220–260 PSI (1.52–1.79 MPa).

Additionally, Examples 6 and 7 showed that without the two-part resin curing system featheredge was not achieved; however, in the case of Example 7 overlap shear adhesion was increased, perhaps due to scrubbing with the nonwoven.

EXAMPLES 17–29

Examples 17–29 illustrated the effect of varying the ratio of equivalents of epoxy to equivalents of curative from 1:10 to 10:1 using first and second compositions otherwise as defined in Example 1.

| Ex. No. | Featheredge | Overlap Shear Adhesion (MPa) | Epoxy Equivalents | Curative Equivalents |
|---|---|---|---|---|
| 17 | Pass | 1.624 | 1 | 1.1 |
| 18 | Pass | 1.547 | 1 | 1.25 |
| 19 | Pass | 1.368 | 1 | 1.5 |
| 20 | Pass | 1.679 | 1 | 1 |
| 21 | Pass | 1.700 | 1 | .9 |
| 22 | Pass | 1.811 | 1 | .75 |
| 23 | Pass | 1.583 | 1 | .5 |
| 24 | Pass | 1.645 | 1 | 4 |
| 25 | Fail | 1.659 | 1 | 6 |
| 26 | Fail | 1.569 | 1 | 10 |
| 27 | Pass | 1.154 | 4 | 1 |
| 28 | Pass | 1.078 | 6 | 1 |
| 29 | Marginal | 0.961 | 10 | 1 |

In the above table, the values for curative equivalents and epoxy equivalents reflect relative, not absolute values. These results showed that the ratio of (curative equivalents: epoxy-functional resin equivalents) was preferably in the range of from 4:1 to 1:6 in order to derive the benefits of the invention, i.e., featheredge adhesion and increased overlap shear adhesion.

These results also showed that overlap shear adhesion and featheredge did not always correlate, i.e., a high overlap shear adhesion value did not guarantee a featheredge, and the converse was also true. These results also demonstrated that the invention had utility over a wide range of stoichiometric ratios of epoxy and curative.

EXAMPLES 30–32

Examples 30–32 illustrated the effect of various solvent types used with the preferred epoxy-functional resin ("Epon 828") and preferred curative resin (combination of "Capcure EH-30" and "Capcure 3-800").

| Ex. No. | % Solids | Feather-edge | Overlap Shear Adhesion (MPa) | Curative Solvent | Epoxy Solvent |
|---|---|---|---|---|---|
| 30 | 17 | Pass | 1.741 | Toluene | Toluene |
| 31 | 17 | Pass | 1.327 | MEK | MEK |
| 32 | 17 | Marginal | 1.216 | MEK, 12.5% IPA, 87.5% | MEK, 11.7% IPA, 88.3% |

These results showed that when the hydrocarbon (in this case toluene) was not present in the priming composition that there is insufficient solvent wetting of the TPO substrate to derive the full benefits of the invention.

EXAMPLES 33–39

Examples 33–39 illustrated the effect of varying the type of epoxy curing agent and curing conditions used.

| Ex. No. | % Solids | Feather-edge | Overlap Shear Adhesion (MPa) | Epoxy Resin | Curative |
|---|---|---|---|---|---|
| 33[1] | 18[2] | Pass | 1.706 | Epon 828, 4 parts | Epo-Tuf 37-612, 1 part |
| 34[3] | 18[2] | Fail | N/A | Epon 828, 4 parts | Epo-Tuf 37-612, 1 part |
| 35[1] | 18[4] | Pass | 1.209 | Epon 828, 3.2 parts | Jeffamine D-230, 1.0 part |
| 36[3] | 18[4] | Fail | N/A | Epon 828, 3.2 parts | Jeffamine D-230, 1.0 part |
| 37[1] | 15[4] | Marginal | 0.889 | Epon 828, 10.45 parts | DETA[5], 1.0 part |
| 38[3] | 15[4] | Marginal | N/A | Epon 828, 10.45 parts | DETA[5], 1.0 part |
| 39[3] | 28 | Fail | 0.953 | Epon 828, 7 parts | SbF$_5$-DEG[6], 0.05 part |

[1] Baked at 200° F. (93.3° C.) for 1.5 hour
[2] Solvent Ratio used for epoxy and curative was 50% heptane, 37% IPA, and 13% MEK
[3] Room Temperature Cure for 15 minutes
[4] Solvent Ratio used for epoxy was 50% heptane, 37% IPA, and 13% MEK, and for curative was 50% heptane, 30% ethyl acetate, and 20% IPA
[5] DETA = diethylene triamine
[6] SbF$_5$-DEG is antimony pentafluoride dissolved in diethylene glycol Examples 33–39 illustrated the surprising benefit of using the CAPCURE EH-30/3-800 combination curing agent to achieve room temperature cure. The data showed that other curing agents were capable of producing adequate featheredge appearance and overlap shear adhesion provided that complete cure was obtained (at elevated temperature) prior to application of the filler material.

EXAMPLES 40–48

Examples 40–48 illustrated the effect of changing the type of material used for abrading the plastic during the priming step of the inventive methods.

| Ex. No. | Priming Step Abrading Material | Feather-edge | Overlap Shear Adhesion (MPa) |
|---|---|---|---|
| 40 | 180 Grade Coated Abrasive | Pass | 1.728 |
| 41 | 600 Grade Coated Abrasive | Pass | 1.389 |
| 42 | Emery Cloth | Pass | 1.839 |
| 43 | 1000 grit "SCOTCH-BRITE" nonwoven | Pass | 2.129 |
| 44 | 2000 grit "SCOTCH-BRITE" nonwoven | Pass | 1.949 |
| 45 | "Type T" nonwoven | Pass | 1.618 |
| 46 | 360 grit "SCOTCH-BRITE" nonwoven | Pass | 1.777 |
| 47 | Cheesecloth | Fail | 1.389 |
| 48 | Paint Brush | Fail | N/A |

These results showed the necessity of abrading the surface in the presence of the priming composition of the invention in order to obtain the benefits of featheredge adhesion. Note the nonwoven known under the trade designation SCOTCH-BRITE rand Cleaning and Polishing Rolls Type T did not contain abrasive mineral. The data showed, however, that high overlap shear values may be obtained when the abrading material did contain an abrasive mineral.

EXAMPLES 49–60

Examples 49–60 illustrated the effect of varying the type of plastic material to be repaired when practicing the inventive priming and repair processes.

| Ex. No. | % Solids | Featheredge | Overlap Shear Adhesion (MPa) | Substrate Type |
|---|---|---|---|---|
| 49 | 17 | Pass | 3.400 | Bayflex 110 |
| 50 | N/A[1] | Pass | 3.642 | Bayflex 110 |
| 51 | 17 | Pass | 6.026 | GTX-910 |
| 52 | N/A[1] | Pass | 4.167 | GTX-910 |
| 53 | 17 | Pass | 2.764 | Lomod |
| 54 | N/A | Pass | 1.735 | Lomod |
| 55 | 17 | Pass | 4.699 | Pulse |
| 56 | N/A | Pass | 2.923 | Pulse |
| 57 | 17 | Pass | 2.142 | V-978 |
| 58 | N/A | Pass | 1.541 | V-978 |
| 59 | 17 | Pass | 5.860 | Xenoy |
| 60 | N/A | Pass | 4.326 | Xenoy |

[1]"N/A" means the primer was not scrubbed into the plastic

These results showed the utility of the invention extends to many types of plastic materials.

Comparative Examples 61–69

Examples 61–69 illustrated the effect of using prior art chlorinated polyolefin polymers as primers. The 3M primer was a solution of chlorinated polyolefin resin in toluene solvent. The Eastman Chemical primer known under the trade designation "CP-310W", available from Eastman Chemical Co., Kingsport, Tenn., was a water based emulsion of a chlorinated polyolefin resin.

| Ex. No. | Primer | % Solids | Featheredge | Overlap Shear Adhesion (MPa) | Substrate |
|---|---|---|---|---|---|
| 61 | 3M | N/A | Pass | 1.348 | Himont 3163 |
| 62 | Eastman | 15 | Pass | 1.258 | Himont 3163 |
| 63 | Eastman | 15 | Pass | 1.645 | Himont 3163 |
| 64 | Eastman | 15 | Pass | N/A | Bayflex 110 |
| 65 | Eastman | 15 | Pass | N/A | Bayflex 150 |
| 66 | Eastman | 15 | Fail | N/A | Pulse |
| 67 | Eastman | 15 | Fail | N/A | GTX-910 |
| 68 | Eastman | 15 | Fail | N/A | Xenoy |
| 69 | Eastman | 15 | Marginal | N/A | V-978 |

These results showed that prior art priming compositions could be used reliably on TPO substrates but not on the wide variety of plastics on which the present invention has utility.

Comparative Examples 70–72

The following procedure was employed to repair TPO surfaces:

Step 1. Clean the TPO surface (Himont 3163) with conventional hand soap and water, followed by 3M General Purpose Adhesive Remover No. 8984.

Step 2. Emery cloth was used to scrub a 3% solution of hydrogen peroxide into the substrate and allowed 15 minutes to evaporate.

Additionally, a nonwoven known under the trade designation "SCOTCH-BRITE" Cat. No. 220, was also utilized on another test panel.

Step 3. A layer of RK/SO (a variation of 3M Flexible Parts Repair Material) was applied to the treated surface and allowed a 30 minute dwell time prior to abrading (as described above in the Featheredge Test Method) in Examples 73 and 74.

A cyanoacrylate adhesive known under the trade designation "CA-8" (available from 3M) was used to bond the test plaque in Example 72.

Test Results:

Featheredge tests were total failures for Examples 70 and 71.

| Ex. No. | % Solids | Feather-edge | Overlap Shear Adhesion (MPa) | Abrader | Adhesive |
|---|---|---|---|---|---|
| 70 | 3 | Fail | 0.967 | Emery Cloth | RK/SO |
| 71 | 3 | Fail | 0.428 | SCOTCH-BRITE | RK/SO |
| Control 72 | 0 | N/A[1] | 2.604 | None Used | CA-8 |

[1]Not tested

These results showed that hydrogen peroxide cannot be used as priming composition to obtain the benefits of invention.

Comparative Examples 73–79

A TPO test plaque was repaired using "Versamide" polyamide to cure "Epon 828" epoxy resin as taught by Brenman & Lerchenthal, *Polymer Engineering and Science*, November 1976, Vol. 16, No. 11, pp. 747–770. The following procedure was used:

OVERLAP SHEAR BOND PREPARATION:

1) Cleaned surface of TPO (Himont 3163) with xylene and cheesecloth and allow a 15 minute flash time.
2) The cleaned surface was not abraded with coated abrasives prior to application of the priming solutions.
3) Using Medium Emery Cloth from 3M Cat. No. 9061, and a mixture of "Epon 828" epoxy and "Versamid 140" polyamide (1:1 by weight) the substrate surface was abraded (in air) in the presence of the aforenoted mixture for a total 3 minutes.
4) Rinse the surface from Step 3 using xylene, followed by a 15 minute dwell time.
5) Apply as an adhesive a mixture (1:1 by weight) of "Epon 828" and "Versamid 140". A 22 gauge wire was utilized to control bond thickness.
6) Cure bonds at 80° C. for 18 hours.

To test the "SABRA" (surface activation beneath reactive adhesives) technique of Brenman and Lerchenthal in terms of featheredge adhesion the following adaptation was used to the procedure described above:

Step 1–4 were followed as above. Step 5 utilized RK/SO (a variation of 3M Flexible Parts Repair Material) and a dwell time of 30 minutes. Room temperature cure was utilized prior to abrading as described in the Featheredge Test Method. The following samples were prepared and tested for Featheredge Adhesion and overlap shear:

EXAMPLE 73

Use SABRA Steps 1–4, apply RK/SO, without abrading prior to application, apply with emery cloth, use 30 minute dwell, rinse with xylene, Featheredge with grade 180 coated abrasive.

EXAMPLE 74

Same as Example 73, only after Step 4 cure for 18 hours at 79.4° C. then apply RK/SO.

EXAMPLE 75

Same as Example 74, except abrade with 180 Gold prior to priming Step 3.

EXAMPLE 76

Same as Example 75, only no xylene rinse as stated in Step 4.

EXAMPLE 77

Same as Example 78, only use a 35% solids solution of "Epon 828"/"Versamid 140" in xylene.

EXAMPLE 78

Same as Example 77, only room temperature cure (about 25° C.).

EXAMPLE 79

Same as Example 78, only use "SCOTCH-BRITE" Pad Cat. No. 220, instead of emery cloth to apply primer composition.

| Ex. No. | % Solids | Feather-edge | Overlap Shear Adhesion (MPa) | Part A | Part B |
|---|---|---|---|---|---|
| 73 | 100 | Fail | 1.229 | Epon 828, 1 part | Versmid 140, 1 part |
| 74 | 100 | Fail | N/A | Epon 828, 1 part | Versamid 140, 1 part |
| 74 | 100 | Marginal | 1.485 | Epon 828, 1 part | Versamid 140, 1 part |
| 76 | 100 | Fail | N/A | Epon 828, 1 part | Versamid 140, 1 part |
| 77 | 35 | Fail | 2.045 | Epon 828, 1 part | Versamid 140, 1 part |
| 78 | 35 | Fail | 1.997 | Epon 828, 1 part | Versamid 140, 1 part |
| 79 | 35 | Fail | N/A | Epon 828, 1 part | Versamid 140, 1 part |

EXAMPLES 80–83

The following four examples showed the effect of changing the abrasivity of the abrading material used to prepare the plastic surface prior to mechanochemical surface priming. In these examples, a nonwoven known under the trade designation "SCOTCH-BRITE" (pad no. 220, having 360 grit aluminum oxide abrasive grit) was used to apply the priming solution.

| Ex. No. | Surface Preparation Abrading Material | Feather-edge Adhesion | Overlap Shear Adhesion (MPa) |
|---|---|---|---|
| 80 | None | Fail | 1.554 |
| 81 | 80 Grade 3M STIKIT GOLD | Pass | 1.650 |
| 82 | 600 3M Wet or Dry | Marginal | 1.636 |
| 83 | 320 Grade 3M STIKIT GOLD | Marginal | 1.753 |

This data showed the importance of abrading the surface to a "critical depth" during the surface preparation step prior to beginning repair in order to obtain acceptable featheredge. Since 180 grade abrasive was always used in finish sanding the filled repair, the data suggested that if the surface was prepared using abrasives of 180 grade or finer the featheredge adhesion will be "fail" or be "marginal" at best. This suggests that the 180 grade finishing abrasive cuts through the area abraded with the finer preparation abrasive causing failure or marginal featheredge adhesion. The data also showed that the abrasion of the surface preparation step has little, if any, effect on overlap shear adhesion.

EXAMPLES 84–88

The following examples illustrated the effect of varying the percent solids of the solution and changing the ratio between "Capcure 3-800" and "Capcure EH-30" in the curative:

| Ex. No. | % Solids | Curative ratio by wt. | Featheredge | OLS (psi) |
|---|---|---|---|---|
| 84 | 30 | 8:1 | Pass | 1.408 |
| 85 | 30 | 16:1 | Pass | 1.442 |
| 86 | 30 | 8:1 | Pass | 1.546 |
| 87 | 30 | 16:1 | Pass | 1.346 |
| 88 | 25 | 12:1 | Pass | 1.677 |

EXAMPLES 89–94

Examples 89–94 illustrated how much solvent us retained in various plastic materials which may be repaired in accordance with teachings of the present invention.

| | Solvent: D.I. Water | | | | | |
|---|---|---|---|---|---|---|
| Example | 89 | 90 | 91 | 92 | 93 | 94 |
| Plastic* | 1 | 2 | 3 | 4 | 5 | 6 |
| Water Retained (g) | .0306 | .0107 | .0007 | .0011 | .0027 | .0040 |

1 a polyurethane plastic known under the trade designation "Bayflex 110"
2 a polyurea plastic known under the trade designation "Bayflex 150"
3 a polycarbonate ABS blend plastic known under the trade designation "Pulse"
4 a polycarbonate blend plastic known under the trade designation "Xenoy"
5 a TPO plastic known under the trade designation "3163"
6 A thermoplastic elastomer plastic known under the trade designation "V-978"

| | Solvent: 50/37/13 (Heptane/IPA/MEK) | | | | | |
|---|---|---|---|---|---|---|
| Plastic* | 1 | 2 | 3 | 4 | 5 | 6 |
| Solvent retained (g) | .0252 | .0103 | .0005 | .0010 | .0038 | .0035 |

1 a polyurethane plastic known under the trade designation "Bayflex 110"
2 a polyurea plastic known under the trade designation "Bayflex 150"
3 a polycarbonate ABS blend plastic known under the trade designation "Pulse"
4 a polycarbonate blend plastic known under the trade designation "Xenoy"
5 a TPO plastic known under the trade designation "3163"
6 A thermoplastic elastomer plastic known under the trade designation "V-978"

| | Solvent: 60/30/10 (Heptane/Ethyl Acetate/IPA) | | | | | |
|---|---|---|---|---|---|---|
| Plastic* | 1 | 2 | 3 | 4 | 5 | 6 |
| Solvent retained (g) | .0355 | .0118 | .0077 | .0042 | .0164 | .0067 |

EXAMPLES 95–101

Examples 95–101 measured the amount of various individual solvents retained in "Bayflex 110".

| "Bayflex 110" Solvent Swell in Various Solvents | | | | | | |
|---|---|---|---|---|---|---|
| 95 | 96 | 97 | 98 | 99 | 100 | 101 |
| Initial Solvent | Heptane | MEK | Ethyl Acetate | 70/5/25 H/EA/IPA | IPA | D.I. Water | Toluene |
| Retained | .0072 | .0604 | .0553 | .0250 | .0386 | .0233 | .0759 |

Various changes and modifications of this invention will be apparent to those skilled in the art. The above description, including the Examples, are merely illustrative of the inventive aspects recited by the following claims, and are not intended to limit the claims in any way.

What is claimed is:

1. A priming composition suitable for use in priming a first plastic surface for adhesion of a second plastic material thereto, the composition comprising an epoxy resin and a priming solvent, the composition derived from the combination of:

A. a first composition comprising a first organic material having a plurality of epoxy-functional groups, said first organic material combined with a first organic solvent in a sufficient amount of the first organic solvent to dissolve or disperse the first organic material in the first organic solvent, the first organic solvent comprising a combination of:

a. a hydrocarbon having from 4 to 10 carbon atoms;
   b. an alcohol having from 3 to 10 carbon atoms; and
   c. an ester having from 3 to 10 carbon atoms, with the proviso that the first organic material is soluble in the combination of a, b and c; and B. a second composition comprising a second organic material comprising a major portion of a mercaptan-terminated polymer having a plurality of mercaptan-functional groups and a minor portion of an amine-functional material having a plurality of amine-functional groups, said second organic material combined with a second organic solvent in a sufficient amount of the second organic solvent to dissolve or disperse the second organic material in the second organic solvent, the second organic solvent comprising a combination of:

a'. a hydrocarbon having from 4 to 10 carbon atoms;
   b'. an alcohol having from 3 to 10 carbon atoms; and
   c'. a ketone having from 3 to 10 carbon atoms, with a proviso that the second organic material is soluble in the combination of a', b' and c', the second organic material and the first organic material present in an equivalent weight ratio ranging from about 4:1 to about 1:6, wherein the mixture of the first and second organic solvents comprise the priming solvent and the epoxy resin comprises a reaction product of said first and said second organic materials, the priming solvent present in an amount sufficient to wet and penetrate, but not be substantially retained in the first plastic surface where applied thereto.

2. A composition in accordance with claim 1 wherein said first plastic surface comprises plastic materials selected from the group consisting of thermoplastic polyolefins, polyurethanes, engineering elastomers, and polyphenylene oxide/nylon rubber.

3. A composition in accordance with claim 1 wherein said second plastic material comprises a cured epoxy resin.

4. A composition in accordance with claim 1 wherein said first organic material comprises a reaction product of bisphenol A and epichlorohydrin.

5. A composition in accordance with claim 1 wherein said first organic solvent has a solubility parameter ranging from about 7 to about 13 Hildebrand units.

6. A composition in accordance with claim 1 wherein said second organic solvent has a solubility parameter ranging from about 7 to about 13 Hildebrand units.

7. A composition in accordance with claim 1 adapted so that when equal portions of said first composition and said second composition are mixed to form said priming composition, said priming composition has a weight percent solids ranging from about 10 to about 30 weight percent.

8. A composition in accordance with claim 7 having a weight percent solids ranging from about 15 to about 20 percent.

9. A composition in accordance with claim 1 wherein a and a' are both heptane, b and b' are both isopropyl alcohol, c is ethyl acetate, and c' is methyl ethyl ketone.

* * * * *